United States Patent
Athey et al.

(10) Patent No.: US 9,587,066 B2
(45) Date of Patent: Mar. 7, 2017

(54) ISOCYANATE TRIMERISATION CATALYST SYSTEM, A PRECURSOR FORMULATION, A PROCESS FOR TRIMERISING ISOCYANATES, RIGID POLYISOCYANURATE/POLYURETHANE FOAMS MADE THEREFROM, AND A PROCESS FOR MAKING SUCH FOAMS

(75) Inventors: Phillip S. Athey, Lake Jackson, TX (US); Nathan Wilmot, Missouri City, TX (US); Richard Keaton, Pearland, TX (US); Cecile Boyer, Lake Jackson, TX (US); Timothy Morley, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 69 days.

(21) Appl. No.: 13/125,486

(22) PCT Filed: Nov. 9, 2009

(86) PCT No.: PCT/US2009/063728
§ 371 (c)(1),
(2), (4) Date: Apr. 21, 2011

(87) PCT Pub. No.: WO2010/054313
PCT Pub. Date: May 14, 2010

(65) Prior Publication Data
US 2011/0201708 A1    Aug. 18, 2011

Related U.S. Application Data

(60) Provisional application No. 61/113,193, filed on Nov. 10, 2008.

(51) Int. Cl.
| | |
|---|---|
| *C08G 18/02* | (2006.01) |
| *C08G 18/09* | (2006.01) |
| *C08G 18/16* | (2006.01) |
| *C08G 101/00* | (2006.01) |

(52) U.S. Cl.
CPC ......... *C08G 18/022* (2013.01); *C08G 18/092* (2013.01); *C08G 18/168* (2013.01); *C08G 2101/0025* (2013.01); *C08G 2105/02* (2013.01)

(58) Field of Classification Search
CPC .. C08G 18/022; C08G 18/092; C08G 18/168; C08G 2101/0025; C08G 2105/02
USPC ... 521/107, 108, 128, 129, 170; 252/182.24; 502/162, 164, 167, 200, 208
See application file for complete search history.

(56) References Cited

U.S. PATENT DOCUMENTS

| | | | |
|---|---|---|---|
| 3,876,618 A * | 4/1975 | Clarke .......................... | 528/73 |
| 4,335,219 A | 6/1982 | Clarke et al. | |
| 4,499,253 A | 2/1985 | Kerimis et al. | |
| 4,525,489 A | 6/1985 | Narayan | |
| 4,602,080 A * | 7/1986 | Lambert et al. ................ | 528/67 |
| 4,728,676 A | 3/1988 | Muller et al. | |
| 4,801,663 A | 1/1989 | Ueyanagi et al. | |
| 5,032,623 A * | 7/1991 | Keske et al. .................. | 521/131 |
| 2005/0033005 A1* | 2/2005 | Kocher et al. ................. | 528/44 |
| 2005/0239956 A1* | 10/2005 | Spyrou et al. ................ | 524/589 |
| 2007/0259773 A1 | 11/2007 | Burdeniuc et al. | |
| 2007/0259983 A1 | 11/2007 | Burdeniuc et al. | |

OTHER PUBLICATIONS

Journal of American Chemical Society, vol. 49, p. 3181 (1927).
PCT/US2009/063728 International Search Report and Written Opinion, (2009).
PCT/US2009/063728 International Preliminary Report on Patentability, (2009).

\* cited by examiner

*Primary Examiner* — John Cooney

(57) ABSTRACT

The instant invention provides an isocyanate trimerisation catalyst system, a precursor formulation, a process for trimerising isocyanates, rigid foams made therefrom, and a process for making such foams. A trimerisation catalyst system comprising (a) a phosphonium cation; and (b) an isocyanate-trimer inducing carboxylate anion; wherein said trimerisation catalyst system has a trimerisation activation temperature in the range of equal to or less than 73° C. is provided.

3 Claims, 2 Drawing Sheets

US 9,587,066 B2

ISOCYANATE TRIMERISATION CATALYST SYSTEM, A PRECURSOR FORMULATION, A PROCESS FOR TRIMERISING ISOCYANATES, RIGID POLYISOCYANURATE/POLYURETHANE FOAMS MADE THEREFROM, AND A PROCESS FOR MAKING SUCH FOAMS

CROSS-REFERENCE TO RELATED APPLICATIONS

This application is a non-provisional application claiming priority from the U.S. Provisional Patent Application No. 61/113,193, filed on Nov. 10, 2008, entitled "ISOCYANATE TRIMERISATION CATALYST SYSTEM, A PRECURSOR FORMULATION, A PROCESS FOR TRIMERISING ISOCYANATES, RIGID POLYISOCYANURATE/POLYURETHANE FOAMS MADE THEREFROM, AND A PROCESS FOR MAKING SUCH FOAMS," the teachings of which are incorporated by reference herein, as if reproduced in full hereinbelow.

FIELD OF INVENTION

The instant invention relates to an isocyanate trimerisation catalyst system, a precursor formulation, a process for trimerising isocyanates, rigid polyisocyanurate/polyurethane foams made therefrom, and a process for making such foams.

BACKGROUND OF THE INVENTION

Rigid polyisocyanurate/polyurethane (PIR) foams are widely known and are used in numerous industries. PIR foams are hybrid structures having both groups: urethane groups (resulting from the reaction of —NCO groups of isocyanates with the hydroxyl groups of polyols) and isocyanurate rings, derived from the trimerisation of an excess of —NCO groups against the hydroxyl groups (isocyanate index of greater than 100, for example, 180-600). Trimerisation of —NCO groups is typically catalyzed by special catalysts, such as tris(dimethylaminomethyl) phenol, potassium acetate and other catalysts. The highly crosslinked structure of the PIR foams is derived from the isocyanurate rings generated by the trimerisation of the excess of —NCO groups.

PIR foams are continuously subjected to increased regulations with respect to flame retardant traits and reduced smoke generation. Flame retardant traits and reduced smoke generation are typically improved because of the presence of isocyanurate rings. However, existing trimerisation catalyst systems for producing such isocyanurate rings tend to be active only at high temperatures, which is typical within the core zone of PIR foams. Therefore, the existing trimerisation catalyst systems tend to facilitate the formation of isocyanurate rings mainly in the core zone of the PIR foams. Although the use of existing trimerisation catalyst systems improves the flame retardant and smoke generation traits of the core zone of PIR foams, there is still a need to further improve such properties within the outer zones of such PIR foams. The instant invention facilaites the formation of isocyanurate rings within the outer zones of such PIR foams, and as a result facilitating the improvement of flame retardant and smoke generation traits of the outer zones of PIR foams. The instant invention facilitates and increases the trimerisation of the isocyanurate rings in the outer zones of PIR foams by requiring lower activation temperatures. The instant invention may further provide improved bonding properties, for example, in lamination processes, that is, tensile bond strength of double steel facers of PIR foam panels.

SUMMARY OF THE INVENTION

The instant invention provides an isocyanate trimerisation catalyst system, a precursor formulation, a process for trimerising isocyanates, PIR foams made therefrom, and a process for making such foams.

In one embodiment, the present invention provides a trimerisation catalyst system comprising: (a) a phosphonium cation; and (b) an isocyanate-trimer inducing anion; wherein the trimerisation catalyst system has a trimerisation activation temperature in the range of equal to or less than 73° C.

In an alternative embodiment, the present invention further provides a precursor formulation comprising: (1) at least 25 percent by weight of polyol, based on the weight of the precursor formulation; (2) less than 15 percent by weight of a trimerisation catalyst system, based on the weight of the precursor formulation, comprising; (a) a phosphonium cation; and (c) an isocyanate-trimer inducing anion; wherein the trimerisation catalyst system has a trimerisation activation temperature in the range of equal to or less than 73° C.; and (3) optionally one or more surfactants, one or more flame retardants, water, one or more antioxidants, one or more auxiliary blowing agents, one or more urethane catalysts, one or more auxiliary trimerisation catalysts(other than the trimerisation catalyst system, as described herein), or combinations thereof.

In an alternative embodiment, the present invention further provides a process for trimerisation of isocyanates comprising the steps of: (1) providing one or more monomers selected from the group consisting of an isocyanate, a diisocyanate, a triisocyante, oligomeric isocyanate, a salt of any thereof, and a mixture of any thereof; (2) providing a trimerisation catalyst system comprising; (a) an phosphonium cation; and (b) an isocyanate-trimer inducing anion; wherein the trimerisation catalyst system has a trimerisation activation temperature in the range of equal to or less than 73° C.; (3) trimerising the one or more monomers in the presence of the trimerisation catalyst; and (4) thereby forming an isocyanurate trimer.

In an alternative embodiment, the present invention further provides a method for making a PIR foam comprising the steps of: (1) providing one or more monomers selected from the group consisting of an isocyanate, a diisocyanate, a triisocyante, oligomeric isocyanate, a salt of any thereof, and a mixture of any thereof; (2) providing polyol; (3) providing a trimerisation catalyst system comprising; (a) a phosphonium cation; and (b) an isocyanate-trimer inducing anion; wherein the trimerisation catalyst system has a trimerisation activation temperature in the range of equal to or less than 73° C.; and (4) optionally providing one or more surfactants, one or more flame retardants, water, one or more antioxidants, one or more auxiliary blowing agents, one or more urethane catalysts, one or more auxiliary trimerisation catalysts, or combinations thereof; (5) contacting the one or more monomers, and the polyol, and optionally the one or more surfactants, and optionally the one or more flame retardants, and optionally the water, and optionally the one or more antioxidants, and optionally the one or more auxiliary blowing agents in the presence of the trimerisation catalyst system and optionally the one or more urethane catalysts, and optionally the one or more auxiliary trimerisation catalysts; (6) thereby forming the PIR foam.

In an alternative embodiment, the present invention further provides a PIR foam comprising the reaction product of one or more monomers selected from the group consisting of an isocyanate, a diisocyanate, a triisocyante, oligomeric isocyanate, a salt of any thereof, and a mixture of any thereof with polyol in the presence of a trimerisation catalyst system comprising a phosphonium cation, and an isocyanate-trimer inducing anion, and optionally one or more surfactants, optionally one or more flame retardants, optionally water, optionally one or more antioxidants, optionally one or more auxiliary blowing agents, optionally one or more additional urethane catalysts, and optionally one or more auxiliary trimerisation catalysts, or optionally combinations thereof, wherein the trimerisation catalyst system has a trimerisation activation temperature in the range of equal to or less than 73° C.

In an alternative embodiment, the present invention further provides a PIR foam comprising the reaction product of one or more monomers selected from the group consisting of an isocyanate, a diisocyanate, a triisocyante, oligomeric isocyanate, a salt of any thereof, and a mixture of any thereof with polyol in the presence of a trimerisation catalyst system comprising a phosphonium cation, and an isocyanate-trimer inducing anion, and optionally one or more surfactants, optionally one or more flame retardants, optionally water, optionally one or more antioxidants, optionally one or more auxiliary blowing agents, optionally one or more additional polyurethane catalysts, and optionally one or more auxiliary trimerisation catalysts, or optionally combinations thereof, wherein the PIR foam has a polyisocyanurate trimer ratio ($Abs_{1410}/Abs_{1595}$) of at least 5 at a depth of 12 mm from the rising surface of the rigid foam, measured via ATR-FTIR spectroscopy. In an alternative embodiment, the present invention provides an isocyanate trimerisation catalyst, a precursor formulation, a process for trimerising isocyanates, PIR foams made therefrom, and a process for making such foams, in accordance with any of the preceding embodiments, except that the phosphonium cation has the following structure

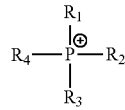

wherein $R_1$ is selected from the group consisting of H, $C_1$-$C_{18}$, N, O and any combinations thereof; wherein $R_2$ is selected from the group consisting of H, $C_1$-$C_{18}$, N, O and any combinations thereof; wherein $R_3$ is selected from the group consisting of H, $C_1$-$C_{18}$, N, O and any combinations thereof; wherein $R_4$ is selected from the group consisting of H, $C_1$-$C_{18}$, N, O and any combinations thereof.

In an alternative embodiment, the present invention provides an isocyanate trimerisation catalyst, a precursor formulation, a process for trimerising isocyanates, PIR foams made therefrom, and a process for making such foams, in accordance with any of the preceding embodiments, except the $R_1$ is $C_1$-$C_{18}$; and $R_2$ is $C_1$-$C_{18}$; and $R_3$ is $C_1$-$C_{18}$; and $R_4$ is $C_1$-$C_{18}$.

In an alternative embodiment, the present invention provides an isocyanate trimerisation catalyst, a precursor formulation, a process for trimerising isocyanates, PIR foams made therefrom, and a process for making such foams, in accordance with any of the preceding embodiments, except that the $R_1$ is butyl or aromatic; and $R_2$ is butyl or aromatic; and $R_3$ is butyl or aromatic; and $R_4$ is butyl or aromatic.

In an alternative embodiment, the present invention provides an isocyanate trimerisation catalyst, a precursor formulation, a process for trimerising isocyanates, PIR foams made therefrom, and a process for making such foams, in accordance with any of the preceding embodiments, except phosphonium cation is tetraethylphosphonium cation or tetrabutylphosphonium cation.

In an alternative embodiment, the present invention provides an isocyanate trimerisation catalyst, a precursor formulation, a process for trimerising isocyanates, PIR foams made therefrom, and a process for making such foams, in accordance with any of the preceding embodiments, except that the isocyanate-trimer inducing anion is selected from the group consisting of carboxylate, carbonate, phenoxide, amide, amidinate, imides, phosphidos, thiocyanate, thioisocyanate, isocyanate, cyanate, and fluoride.

In an alternative embodiment, the present invention provides an isocyanate trimerisation catalyst, a precursor formulation, a process for trimerising isocyanates, PIR foams made therefrom, and a process for making such foams, in accordance with any of the preceding embodiments, except that the isocyanate-trimer inducing anion is selected from the group consisting of carboxylate, carbonate, phenoxide, and fluoride.

In an alternative embodiment, the present invention provides an isocyanate trimerisation catalyst, a precursor formulation, a process for trimerising isocyanates, PIR foams made therefrom, and a process for making such foams, in accordance with any of the preceding embodiments, except that the isocyanate-trimer inducing anion is carboxylate.

In an alternative embodiment, the present invention provides an isocyanate trimerisation catalyst, a precursor formulation, a process for trimerising isocyanates, PIR foams made therefrom, and a process for making such foams, in accordance with any of the preceding embodiments, except that the carboxylate has the following structure

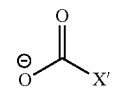

wherein X' is selected from the group consisting of H, $C_1$-$C_{18}$, aliphatic, aromatic, cyclic, acyclic, acyl, and derivatives thereof.

In an alternative embodiment, the present invention provides an isocyanate trimerisation catalyst, a precursor formulation, a process for trimerising isocyanates, PIR foams made therefrom, and a process for making such foams, in accordance with any of the preceding embodiments, except that the carboxylate is selected from the group consisting of formate, acetate, octanoate, 2-ethylhexanoate, benzoate, and substituted derivatives thereof.

In an alternative embodiment, the present invention provides an isocyanate trimerisation catalyst, a precursor formulation, a process for trimerising isocyanates, PIR foams made therefrom, and a process for making such foams, in accordance with any of the preceding embodiments, except that the isocyanate-trimer inducing anion is acetate.

In an alternative embodiment, the present invention provides an isocyanate trimerisation catalyst, a precursor formulation, a process for trimerising isocyanates, foams made therefrom, and a process for making such foams, in accordance with any of the preceding embodiments, except that the trimerisation catalyst system is tetrabutylphosphonium or tetraphenylphosphonium acetate.

In an alternative embodiment, the present invention provides PIR foams, and a process for making such foams, in accordance with any of the preceding embodiments, except that the foam is used as thermal insulation such as construction thermal insulation foams or appliance thermal insulation foams.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
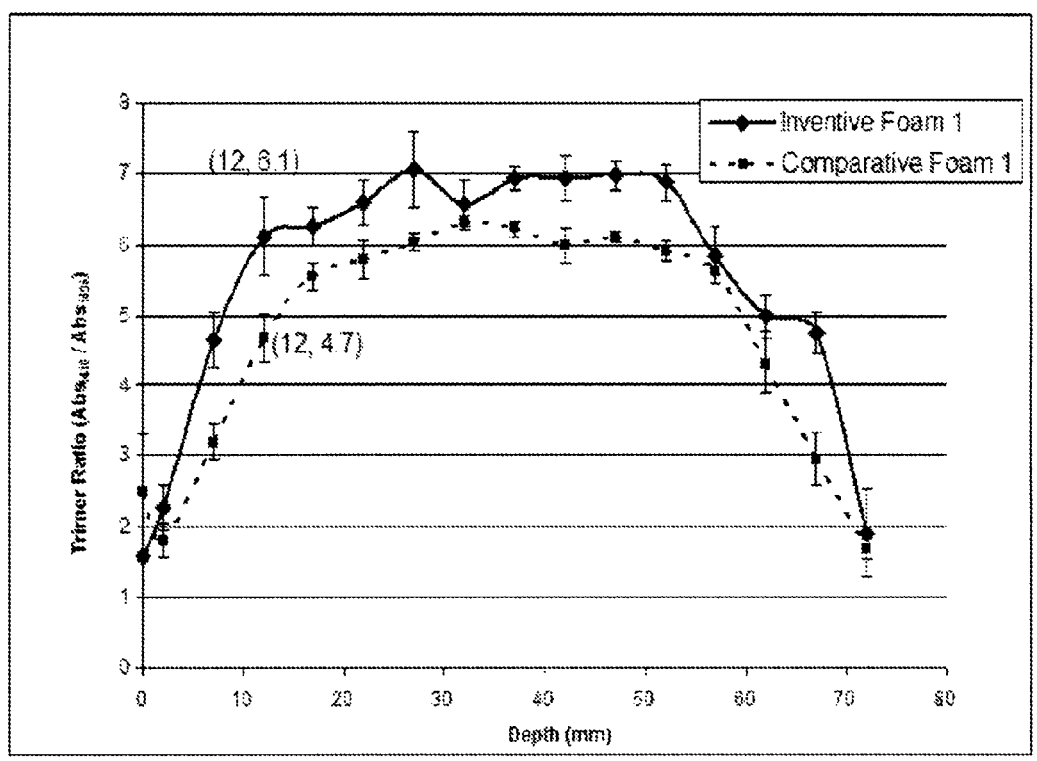
FIG. 1 is an illustrative graph showing the trimer content of one exemplary inventive foam versus a comparative foam.

The instant invention provides an isocyanate trimerisation catalyst system, a precursor formulation, a process for trimerising isocyanates, PIR foams made therefrom, and a process for making such foams.

The isocyanate trimerisation catalyst system comprises: (a) a phosphonium cation; and (b) an isocyanate-trimer inducing anion. The isocyanate trimerisation catalyst system has a trimerisation activation temperature in the range of equal to or less than 73° C. All individual values and subranges from less than 73° C. are included herein and disclosed herein; for example, the activation temperature can be from a lower limit of 25, 35, 45, or 55° C. to an upper limit of 45, 55, 65, 70 or 73° C. For example, the isocyanate trimerisation catalyst system has a trimerisation activation temperature in the range of equal to or less than 70° C. ° C., or equal to or less than 68° C. ° C., or equal to or less than 66° C. ° C., or equal to or less than 65° C. ° C. In one embodiment, the isocyanate trimerisation catalyst system is free of any polymeric support.

The phosphonium cation component of the isocyanate trimerisation catalyst system has the following structure

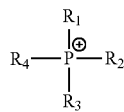

wherein $R_1$ is selected from the group consisting of H, $C_1$-$C_{18}$, N, O and any combinations thereof; wherein $R_2$ is selected from the group consisting of H, $C_1$-$C_{18}$, N, O and any combinations thereof; wherein $R_3$ is selected from the group consisting of H, $C_1$-$C_{18}$, N, O and any combinations thereof; wherein $R_4$ is selected from the group consisting of H, $C_1$-$C_{18}$, N, O and any combinations thereof.

In one embodiment, $R_1$ is $C_1$-$C_{18}$; and $R_2$ is $C_1$-$C_{18}$; and $R_3$ is $C_1$-$C_{18}$; and $R_4$ is $C_1$-$C_{18}$. In one embodiment, the $R_1$ is butyl or aromatic; and $R_2$ is butyl or aromatic; and $R_3$ is butyl or aromatic; and $R_4$ is butyl or aromatic. The phosphonium cation may, for example, be tetraethylphosphonium cation or tetrabutylphosphonium cation.

The isocyanate-trimer inducing anion, as used herein, refers to an anion, which facilitates the trimerisation of isocyanates in the presence of one or more phosphonium cations. The isocyanate-trimer inducing anion is, for example, an anion selected from the group consisting of carboxylate, carbonate, phenoxide, amide, amidinate, imides, phosphidos, thiocyanate, thioisocyanate, isocyanate, cyanate, and fluoride. In the alternative, the isocyanate-trimer inducing anion is selected from the group consisting of carboxylate, carbonate, phenoxide, and fluoride. In another alternative, the isocyanate-trimer inducing anion is carboxylate. The carboxylate may, for example, have the following structure:

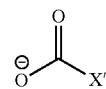

wherein X' is selected from the group consisting of H, $C_1$-$C_{18}$, aliphatic, aromatic, cyclic, acyclic, acyl, and derivatives thereof. The carboxylate may, for example, be selected from the group consisting of formate, acetate, octanoate, 2-ethylhexanoate, benzoate, and substituted derivatives thereof. In the alternative, the isocyanate-trimer inducing anion is acetate.

In one embodiment, the trimerisation catalyst system is tetrabutylphosphonium or tetraphenylphosphonium acetate.

The precursor formulation according to the instant invention comprises (a) one or more polyols; (b) the inventive trimerisation catalyst system, as described hereinabove; and (c) optionally one or more surfactants, one or more flame retardants, water, one or more antioxidants, one or more auxiliary blowing agents, one or more urethane catalysts, one or more auxiliary trimerisation catalysts, or combinations thereof. The precursor formulation comprises at least 25 percent by weight of one or more polyols, as described hereinbelow, based on the weight of the precursor formulation. All individual values and subranges from at least 25 weight percent are included herein and disclosed herein; for example, the weight percent of one or more polyols can be from a lower limit of 25, 30, 35, 40 or 45 weight percent (W percent) to an upper limit of 45, 50, 55, 65, 75, 85, 90, 95, or 98 W percent. For example, the precursor formulation comprises 25 to 98; or 30 to 98; or 35 to 98; or 45 to 95 percent by weight of one or more polyols, based on the weight of the precursor formulation. The precursor formulation comprises less than or equal to 15 percent by weight of the inventive trimerisation catalyst system, as described hereinabove, based on the weight of the precursor formulation. All individual values and subranges from less than or equal to 15 weight percent are included herein and disclosed herein; for example, the weight percent of the trimerisation catalyst system can be from a lower limit of 0.1, 1, 2, 4, 5, 7, or 10 W percent to an upper limit of 10, 12, 14, or 15 W percent. For example, the precursor formulation comprises 2 to 15; or 4 to 15; or 5 to 15 or 7 to 15; or 10 to 15 percent by weight of the inventive trimerisation catalyst system, based on the weight of the precursor formulation.

The inventive trimerisation catalyst system may, for example, be employed to trimerise one or more monomers selected from the group consisting of an isocyanate, a diisocyanate, a triisocyante, oligomeric isocyanate, a salt of any thereof, and a mixture of any thereof to form one or more isocyanurate rings.

The inventive trimerisation catalyst system may further be employed to form a PIR foam. The process for forming a PIR foam, described in further details herein below, may generally include the following steps: (1) providing one or more monomers selected from the group consisting of an isocyanate, a diisocyanate, a triisocyante, oligomeric isocyanate, a salt of any thereof, and a mixture of any thereof; (2) providing polyol; (3) providing a trimerisation catalyst system comprising; (a) a phosphonium cation; and (b) an isocyanate-trimer inducing anion; wherein said trimerisation catalyst system has a trimerisation activation temperature in the range of equal to or less than 73° C.; and (4) optionally providing one or more surfactants, one or more flame retardants, water, one or more antioxidants, one or more auxiliary blowing agents, one or more urethane catalysts, one or more auxiliary trimerisation catalysts, or combinations thereof; (5) contacting the one or more monomers, and the polyol, and optionally the one or more surfactants, and optionally the one or more flame retardants, and optionally the water, and optionally the one or more antioxidants, and optionally the one or more auxiliary blowing agents in the presence of the trimerisation catalyst system and optionally the one or more urethane catalysts, and optionally the one or more auxiliary trimerisation catalysts; and (6) thereby forming the polyisocyanurate/polyurethane rigid foam.

PIR foams according to the instant invention may, preferably, be produced by employing the trimerisation catalyst system, as described above, in combination with conventional urethane catalysts in the urethane formulation.

The term "isocyanate," as used herein refers to any compound including polymers that contain at least one isocyanate group such as monoisocyanates and organic polyisocyanates. Representative organic polyisocyanates suitably employed include, but are not limited to, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; aromatic triisocyanates such as tris-(4-isocyanatophenyl)methane; 2,4,6-toluene tris(isocyanates); the aromatic tetra(isocyanates), such as 4,4'-dimethyldiphenylmethane-2,2',5,5'-tetra(isocyanate) and the like; alkylaryl polyisocyanate such as xylene diisocyanate; aliphatic polyisocyanates such as hexamethylene-1,6-diisocyanate; ethylene diisocyanate, dicyclohexyl and methane- 4,4'-diisocyanate and mixtures thereof. Other organic polyisocyanates include polymethylene polyphenyl isocyanate, hydrogenated methylene diphenylisocyanate, m-phenylene diisocyanate, naphthylene-1,5-diisocyanate, 1-methoxyphenyl-2,4-diisocyanate, diphenylmethane-4,4'-biphenylene diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate, isophorone diisocyanate, 1,3-bis-(isocyanatomethyl)benzene, cumene-2,4-diisocyanate, 4-methoxy-1,3-phenylene diisocyanate, 4-chloro-1,3-phenylene diisocyanate, 4-bromo-1,3-phenylene diisocyanate, bromo-1,3-phenylene diisocyanate, 4-ethoxy-1,3-phenylene diisocyanate, 2,4'-diisocyanatodiphenyl ether, 5,6-dimethyl-1,3-phenylene diisocyanate, 2,4-dimethyl-1,3-phenylene diisocyanate, 4,4-diisocyanatodiphenyl ether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane, 2,6'-dimethyl-4,4'-diisocyanatodiphenyl and mixtures thereof. Also suitable are polyisocyanates of higher functionality such as dimers and particularly NCO-terminated oligomers of isocyanates containing isocyanate rings as well as prepolymers and mixtures of the aforementioned isocyanates. Also suitable are those sometimes referred to as quasi-prepolymers of such isocyanates prepared by reacting an excess of isocyanate with an active hydrogen compound such as a polyol, preferably those made by reacting at least 2 moles of isocyanate group with one mole of active hydrogen-containing compound. These polyisocyanates are prepared by conventional methods known in the art such as phosgenation of the corresponding organic amine.

In one embodiment, aromatic polyisocyanates for production of the PIR foam include, but are not limited to, the diphenylmethane diisocyanates (MDI) in the form of its 2,4'-, 2,2'-, and 4,4'-isomers and mixtures thereof and/or mixtures of MDI oligomers known as polymeric MDI. In the alternative, polyisocyanate may be the so-called polymeric MDI products, which are a mixture of polymethylene polyphenylene polyisocyanates in monomeric MDI.

In one embodiment, when producing PIR foam, the amount of monoisocyanate is generally less than 10 weight percent of total isocyanate; less than 7 weight percent of total isocyanate, less than 5 weight percent of total isocyanate, less 2 weight percent of total isocyanate, or none.

Active hydrogen compounds suitably reacted with the isocyanate in the practice of this invention include any compounds including polymers containing at least one active hydrogen moiety. For the purposes of this invention, an active hydrogen moiety refers to a moiety containing a hydrogen atom which, because of its position in the molecule, displays significant activity according to the Zerewitnoff test described by Kohler in the Journal of American Chemical Society, Vol. 49, page 3181 (1927). Illustrative of such active hydrogen moieties are —COOH, —OH, —NH$_2$, —CONH$_2$, —SH and —CONH—. Hereinafter, such compounds shall be referred to as monols (one active hydrogen moiety per molecule) and polyols (two or more active hydrogen moieties per molecule). Polyol(s) or polyol blends suitable for producing PIR foams of the instant invention may, for example, have a number average functionality in the range of 2 to 8, or in the alternative in the range of 3 to 8, and a hydroxyl equivalent weight of 60 to 560, or in the alternative in the range of 90 to 400.

Typical active hydrogen compounds include monols and polyols, amines including polyamines, amides including polyamides, mercaptans including polymercaptans, acids including polyacids and the like. Examples of suitable hydroxyl compounds are the following (including mixtures thereof): monohydric alcohols such as ethanol, propanol and butanol as well as monohydric phenols such as phenol. Of particular interest are the polyols such as polyether polyols, the polyester polyols, homopolymers and copolymers of hydroxyalkyl acrylates and methacrylates, polyepoxide resins, phenol-formaldehyde resins, polyhydroxy terminated polyurethane polymers, polyhydroxyl-containing phosphorus compounds and alkylene oxide adducts of polyhydric thioethers, acetals including polyacetals, aliphatic and aromatic polyols and thiols including polythioethers, ammonium and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also, alkylene adducts of compounds which contain one —SH group and one —OH group as well as those which contain an amino group and a —SH group may be used. Exemplary polyether polyols, employed as the polyol in the practice of this invention, include polyalkylene polyether polyols, for example, diols such as ethylene glycol, propylene glycol, butylene glycol, and diethylene glycol. Exemplary alcohols that are advantageously employed as initiator in making the polyether polyol includem, but are not limited to, methanol, ethanol, ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included within the term "alcohol" are compounds derived from phenol such as 2,2-(4,4'-hydroxyphenyl)propane, commonly known as bisphenol A; sugars such as sucrose, glucose, fructose and the like. Illustrative alkylene oxides that are advantageously employed in the preparation of the polyether polyol include ethylene oxide, propylene oxide, butylene oxide, amylene oxide and random or block copolymers of two or more of these oxides; glycidol; glycidyl ethers or thioethers such as methyl glycidyl ethers, t-butyl glycidyl ether and phenyl glycidyl ether.

The polyester polyols are reaction products of polycarboxylic acids and alcohols particularly polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid and 1,4-cyclohexane-dicarboxylic acid. Any suitable alcohol including both aliphatic and aromatic may be used. Examples of suitable alcohols are those polyhydric alcohols described hereinbefore. Also included with the term "polyhydric alcohol" are compounds derived from phenol such as 2,2-(4,4'-hydroxyphenyl)propane, commonly known as bisphenol A; polyacetone polyols and the like.

Other polyols suitably employed include, but are not limited to, polyalkylene polyamines such as ethylenediamine; amino alcohols such as amino ethanol; esters of phosphoric, sulfonic and boric acids; cellulose-like polymers such as starch and methyl cellulose; peptides and polypeptides; methylol resins such as urea-formaldehyde and melamineformaldehyde; lactone polyols prepared by reacting a lactone such as ε-caprolactone or a mixture of ε-caprolactone and an alkylene oxide with a polyfunctional initiator such as a polyhydric alcohol, an amine or an amino alcohol. In one embodiment, the polyalkylene ether diols may be ethylene glycol, diethylene glycol, triethylene glycol, ethoxylated glycerin, polyether diols of ethylene oxide and/or propylene oxide. The particular isocyanate and active hydrogen compound as well as quantities thereof to be employed in the practice of this invention depend upon the particular end use application desired. Such choices are within the skill of the art to which such end use is directed.

In addition to the previously disclosed isocyanate, active hydrogen, and trimerisation catalyst system, other ingredients such as surfactants and blowing agents are often advantageously included.

In addition to the aforementioned ingredients of the FIR foam formulation, other substances such as surfactants, blowing agents, fillers, dyes, pigments, cross-linking agents, chain extenders, flame retarding agents and smoke suppressing agents may be employed.

The trimerisation catalyst system according to the instant invention is useful in the formation of foam products for rigid and flame retardant applications, which usually require a high Isocyanate Index. Isocyanate Index, as used herein, refers to the actual amount of polyisocyanate used divided by the theoretically required stoichiometric amount of polyisocyanate required to react with all the active hydrogen in the reaction mixture, multiplied by 100. For purposes of the present invention, Isocyanate Index is represented by the equation: Isocyanate Index=(Eq NCO/Eq of active hydrogen)×100, wherein Eq NCO is the number of NCO functional groups in the polyisocyanate, and Eq of active hydrogen is the number of equivalent active hydrogen atoms.

Foam products which are produced with an Isocyanate Index from 80 to 800 are within the scope of this invention. In accordance with other aspects of the present invention, the Isocyanate Index is from 100 to 700, from 150 to 650, from 150 to 600, or from 180 to 500.

Blowing agents include, but are not limited to, isobutene, dimethyl ether, water, methylene chloride, acetone, chlorofluorocarbons (CFCs), hydrofluorocarbons (HFCs), hydrochlorofluorocarbons (HCFCs), and hydrocarbons. Non-limiting examples of HFCs include HFC-245fa, HFC-134a, HFC-152a, HFC-227ea, and HFC-365. Illustrative examples of HCFCs include HCFC-141b, HCFC-22, and HCFC-123. Exemplary hydrocarbons include n-pentane, isopentane, cyclopentane, and the like, or any combination thereof. The amount of blowing agent used can vary based on, for example, the intended use and application of the foam product and the desired foam stiffness and density. In the foam formulation and method for preparing a PIR foam of the present invention, the blowing agent is present in amounts from 1 to 80 parts by weight per hundred weight parts polyol (pphp), from 5 to 60 pphp, from 7 to 60 pphp, from 10 to 60 pphp, from 12 to 60 pphp, from 14 to 40 pphp, or from 16 to 25 pphp. If water is present in the formulation, for use as a blowing agent or otherwise, water is present in amounts up to about 15 pphp. In other words, water can range from 0 to 15 pphp. In another aspect, water can range from 0 to 10 pphp, from 0.1 to 10 pphp, from 0 to 8 pphp, from 0 to 6 pphp, from 0.3 to 5, or from 0.4 to 4 pphp.

Urethane catalysts accelerate the reaction to form polyurethanes, in the process of making PIR foams. Urethane catalysts suitable for use herein include, but are not limited to, metal salt catalysts, such as organotins, and amine compounds, such as triethylenediamine (TEDA), N-methylimidazole, 1,2-dimethylimidazole, N-methylmorpholine, N-ethylmorpholine , triethylamine, N,N'-dimethylpiperazine, 1,3,5-tris(dimethylaminopropyl)hexahydrotriazine, 2,4,6-tris(dimethylaminomethyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylaminocyclohexylamine, pentamethyldipropylene-triamine, triethanolamine, dimethylethanolamine, bis(dimethylaminoethyl)ether, tris(3-dimethylamino)propylamine, 1,8-diazabicyclo[5.4.0] undecene (DBU), or its acid blocked derivatives, and the like, as well as any mixture thereof.

For preparing a PIR foam of the present invention, the urethane catalyst can be present in the formulation from 0 to 15 pphp, from 0 to 10 pphp, from 0 to 8 pphp, from 0 to 6 pphp, from 0 to 4 pphp, from 0 to 2 pphp, or from 0 to 1 pphp. In another aspect, the urethane catalyst is present from 0 to 0.8 pphp, from 0 to 0.6 pphp, from 0 to 0.4 pphp, or from 0 to 0.2 pphp.

For preparing a PIR foam of the present invention, an optional auxiliary trimerisation catalyst can be present in the formulation from 0 to 15 pphp, from 0 to 10 pphp, from 0 to 8 pphp, from 0 to 6 pphp, from 0 to 4 pphp, from 0 to 2 pphp, or from 0 to 1 pphp. In another aspect, the urethane catalyst is present from 0 to 0.8 pphp, from 0 to 0.6 pphp, from 0 to 0.4 pphp, or from 0 to 0.2 pphp.

Depending upon on the requirements during foam manufacturing or for the end-use application of the foam product, various additives can be employed in the PIR foam formulation to tailor specific properties. These include, but are not limited to, cell stabilizers, flame retardants, chain extenders, epoxy resins, acrylic resins, fillers, pigments, or any combination thereof. It is understood that other mixtures or materials that are known in the art can be included in the foam formulations and are within the scope of the present invention.

Cell stabilizers include surfactants such as organopolysiloxanes. Surfactants can be present in the PIR foam formulation in amounts from 0.5 to 10 pphp, 0.6 to 9 pphp, 0.7 to 8 pphp, 0.8 to 7 pphp, 0.9 to 6 pphp, 1 to 5 pphp, or 1.1 to 4 pphp. Useful flame retardants include halogenated organophosphorous compounds and non-halogenated compounds. For example, trichloropropylphosphate (TCPP) is a halogenated flame retardant, and triethylphosphate ester (TEP) is a non-halogenated flame retardant. Depending on the end-use foam application, flame retardants can be present in the foam formulation in amounts from 0 to 50 pphp, from 0 to 40 pphp, from 0 to 30 pphp, or from 0 to 20 pphp. In another aspect, the flame retardant is present from 0 to 15 pphp, 0 to 10 pphp, 0 to 7 pphp, or 0 to 5 pphp. Chain extenders such as ethylene glycol and butane diol can also be employed in the present invention.

The present invention further provides a method for preparing a PIR foam which comprises contacting at least one polyisocyanate with at least one active hydrogen-containing compound, in the presence of an effective amount of the inventive trimerisation catalyst system.

The trimerisation catalyst system should be present in the foam formulation in a catalytically effective amount. In PIR foam formulations of the present invention, the trimerisation catalyst system is present in amounts from 0.05 to 15 parts by weight per hundred weight parts of the at least one active hydrogen-containing compound, including the weight contribution of the catalyst system diluent, for example, diethylene glycol. In another aspect, the trimerisation catalyst system is present in amounts from 0.4 to 10 parts, or from 0.4 to 9 parts, or from 0.8 to 8 parts, by weight per hundred weight parts of the at least one active hydrogen-containing compound. If the at least one active hydrogen-containing compound is an at least one polyol, the trimerisation catalyst system is present in amounts from 0.05 to 15 parts by weight per hundred weight parts polyol (pphp). In another aspect, the catalyst composition is present in amounts from 0.2 to 10 pphp; from 0.2 to 9.5 pphp, from 0.4 to 9 pphp, from 0.6 to 8.5 pphp, or from 0.8 to 8 pphp.

Given the number of components involved in PIR formulations, there are many different orders of contacting or combining the components, and one of skill in the art would realize that varying the order of addition of the components falls within the scope of the present invention. In addition, the method of producing PIR foams can further comprise the presence of at least one additive selected from at least one cell stabilizer, at least one flame retardant, at least one chain extender, at least one epoxy resin, at least one acrylic resin, at least one filler, at least one pigment, or any combination thereof.

In a further aspect of the present invention, a premix of ingredients other than the at least one polyisocyanate can be contacted first, followed by the addition of the at least one polyisocyanate. For example, the at least one active hydrogen-containing compound, the at least one blowing agent, and the inventive trimerisation catalyst system are contacted initially to form a premix. The premix is then contacted with the at least one polyisocyanate to produce PIR foams in accordance with the method of the present invention. In a still further aspect of the present invention, the same method can be employed, wherein the premix further comprises at least one urethane catalyst. Likewise, the premix can further comprise at least one additive selected from at least one cell stabilizer, at least one flame retardant, at least one chain extender, at least one epoxy resin, at least one acrylic resin, at least one filler, at least one pigment, or any combination thereof.

One aspect of the present invention provides a method for preparing a PIR foam comprising (a) forming a premix comprising: (i) at least one active hydrogen-containing polyol; (ii) 10 to 80 parts by weight per hundred weight parts of the polyol (pphp) blowing agent; (iii) 0.5 to 10 pphp surfactant; (iv) zero to 10 pphp water; (v) zero to 50 pphp flame retardant; (vi) zero to 10 pphp urethane catalyst; and (vii) 0.05 to 15 pphp of the inventive trimerisation catalyst system; and (b) contacting the premix with at least one polyisocyanate at an Isocyanate Index from 80 to 800.

In one embodiment, the PIR foams of the instant invention may be used as thermal insulation such as construction thermal insulation foams or appliance thermal insulation foams.

In another embodiment, the above described components required for making a PIR foam are sprayed together and mixed at the departure point from the spray nozzle to form a thermal insulation foam on a wall.

EXAMPLES

The following examples illustrate the present invention but are not intended to limit the scope of the invention.

Preparation of the Trimerisation Catalyst System

Tetraphenylphosphonium acetate, Inventive TCS 1

A 1.0 M solution of Tetraphenylphosphonium Br was prepared in anhydrous MeOH. To this was added 1.05 equivalents of KOAc as a solid. The mixture was allowed to stir overnight. The reaction mixture was filtered through a M frit and the filtrate dried in vacuo to yield Tetraphenylphosphonium acetate.

Tetrabutylphosphonium acetate. Inventive TCS 2

A 1.0 M solution of Tetrabutylphosphonium $BF_4$ was prepared in anhydrous MeOH. To this was added 1.05 equivalents of KOAc as a solid. The mixture was allowed to stir overnight. The reaction mixture was filtered through a M frit and the filtrate dried in vacuo to yield Tetrabutylphosphonium acetate.

Determination of Catalyst Activation Temperature

Inventive Example 1

Each of the inventive trimerisation catalyst systems (TCS) 1-2 samples are dissolved in diethylene glycol and mixed in PMDI for 45 seconds at about 25° C., and placed in DSC sample pan. The catalyst activation temperature of each inventive sample is measured via DSC method as described below. The trimer formation is confirmed via IR. The results are shown in Table 1.

Comparative Example 1

Comparative sample 1-3 are prepared according to the same method as inventive samples 1-2, described above.

The catalyst activation temperature of each comparative sample is measured via DSC method as described below. The trimmer formation is confirmed via IR. The results are shown in Table 1.

Foam Formation

Inventive Example 2

Inventive foams are produced via a Cannon HP-60 and a Hi Tech Eco-RIM high pressure machine. Total machine through put was from ~200 to 225 g/second. Foam samples were generated using molds preheated to 51.7° C., while chemical temperature varied between 21 and 27° C. for the following formulation: a premix of the polyol (aromatic polyester polyol, 100 phpp), the trimerisation catalyst system (less than 6 phpp); flame retardant (TCPP, 4.7 phpp), surfactant (1.7 phpp), urethane catalyst (Polycat™ 5 catalyst, 0.15 phpp), blowing agent (n-pentane, 17 phpp), and water. Sufficient isocyanate (polymeric MDI) and the premix are brought together to achieve the desired Isocyanate Index (for example, 270 or 500). The trimer content of inventive foam 1 is measured via ATR-FTIR spectroscopy, and the results are shown in FIG. 1.

Comparative Example 2

Comparative foams are produced via a Cannon HP-60 and a Hi Tech Eco-RIM high pressure machine. Total machine through put was from ~200 to 225 g/second. Foam samples were generated using molds preheated to 51.7° C., while chemical temperature varied between 21 and 27° C. for the following formulation: a premix of the polyol (aromatic polyester polyol, 100 phpp), DABCO TMR-2 catalyst (less than 6 phpp); flame retardant (TCPP, 4.7 phpp), surfactant (1.7 phpp), urethane catalyst (Polycat™ 5 catalyst, 0.15 phpp), blowing agent (n-pentane, 17 phpp), and water. Sufficient isocyanate (polymeric MDI) and the premix are brought together to achieve the desired Isocyanate Index (for example, 270 or 500). The trimer content of the comparative 1 is measured via ATR-FTIR spectroscopy, and the results are shown in FIG. 1.

TEST METHODS

Test methods include the following:
Differential Scanning Calorimetry Method
Differential Scanning calorimetry (DSC) method is performed using a TA 2920 dual-sample DSC. Samples are run in hermetically sealed aluminum DSC pans that have holes poked in the lids to allow for venting of gases. Catalyst loading is ca. 1 mol-percent with respect to total isocyanate in 1 gram of PAPI 20 polymeric MDI. For standard runs no additional —OH is added to the formulation except what is present in catalyst solutions. Samples are prepared and analyzed via the following method:
1. Catalyst solution is added to a 20 ml vial and the mass is recorded.
2. PAPI 20 ca. 1.0 g is added to the vial and the mixture is stirred for approximately 45 seconds with a Teflon coated spatula.
3. Two aliquots are taken (1-10 mg) and placed in the bottom of pre-weighed DSC pans that are then hermetically sealed.
4. Samples are then immediately placed in the TA 2920 DSC that contained a like pan as the reference.
5. A single scan is performed at a rate of 10° C./min up to 190° C.
6. The onset temperature as well as the peak maximum temperature of the exotherm is calculated as well as the total heat of the exothermic peak. Peak maxima temperatures may generally be used in catalyst comparison/evaluation since calculated onset temperatures can differ by as much as 3 degrees within a single spectrum depending on the choice of points.
7. The instrument is then air-cooled to below 35° C. before the next sample is run.

Replicate samples are run to give a total of four spectra (2 duplicates each of 2 replicate samples). Depending on the amount of —OH in the catalyst solution, the isocyanate index of the "formulations" may range between 1000 and 3500. At a 1000 index formulation, 90 percent of the initial isocyanate is available solely for the trimerisation reaction with the remaining 10 percent being available to react with the hydroxyl groups of the catalyst solvent. It is assumed that at these levels, the major exotherm would be that of the trimerisation reaction.

Fourier Transform Infrared (FTIR) for Trimer Content

A 1"×1"×3" sample spanning the panel thickness is collected in the center of each rigid foam panel. Each sample is subsequently sectioned along the 3" thickness into 5 mm thick slices, except for the very outer edges (that is, the skin) which are cut to 2-3mm thickness. ATR-FTIR measurements are performed on a Nicolet Magna FTIR instrument equipped with a Durascope 1 Bounce ATR diamond crystal accessory. Typically, 16 scans are acquired in the 4000-600cm$^{-1}$ spectral range; the resolution is 4 cm$^{-1}$, the velocity 0.6329, and the aperture 138. FTIR spectra are acquired at each depth on 6 different locations (3 on each facing section at a given depth) except for the outer faces, which are measured on 4 locations each.

Trimer Content

Figure 2:
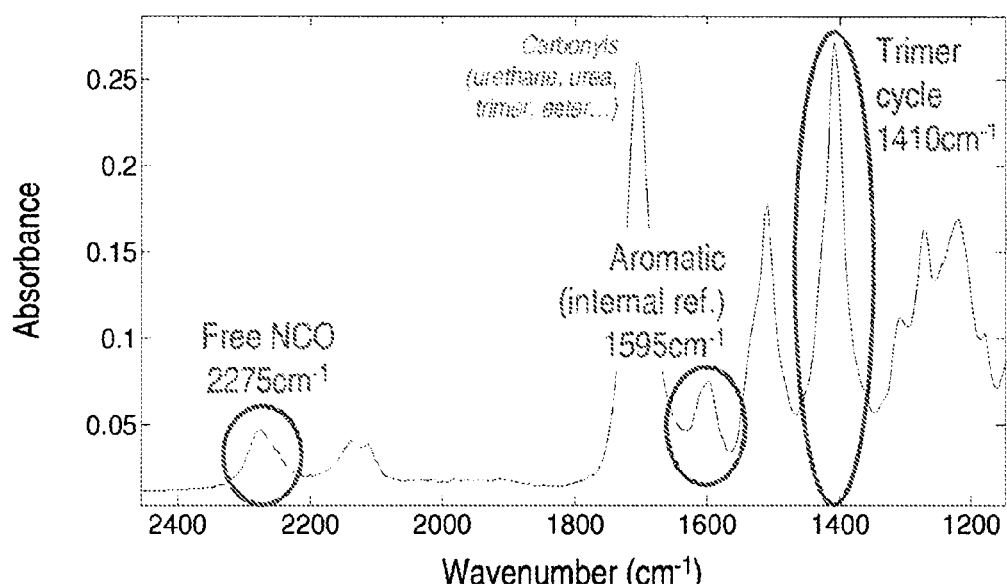
FIG. 2 is an Attenuated Total Reflectance-Fourier Transform Infrared (ATR-FTIR) spectrum of a rigid PIR foam.

A typical Attenuated Total Reflectance-Fourier Transform Infrared (ATR-FTIR) spectrum of a rigid PIR foam is shown in FIG. 2. The 1410 cm$^{-1}$ peak is specific to the trimer 6-membered ring, while vibration modes of the various carbonyls found in urethanes, urea, trimers, and ester moieties all appear as a single peak around 1700 cm$^-$. The small peak at 2275 cm$^{-1}$ corresponds to free, unreacted isocyanate groups, while the aromatic peak at 1595 cm$^{-1}$ is generally used as an internal reference to normalize the data.

The NCO peak height (~2275 cm$^-$) normalized by the aromatic peak height (~1595 cm$^{-1}$) typically indicates the amount of unreacted isocyanate groups in the foam, while the trimer peak height (~1410 cm$^{-1}$), again normalized by the aromatic peak height typically indicates the amount of isocyanurate trimer species in the foam panel. In order to determine the trimer content profile across the depth of each panel, a sample is collected, sliced, and FTIR spectra are acquired according to the method described above. The peak ratios at a given depth are averaged and the standard deviation represents the spread of the peak ratio values over various locations at a given depth in the sample. These quantities illustrate the distribution—or depth profile—of unreacted isocyanate groups and isocyanurate trimers across the panel depth.

The present invention may be embodied in other forms without departing from the spirit and the essential attributes thereof, and, accordingly, reference should be made to the appended claims, rather than to the foregoing specification, as indicating the scope of the invention.

TABLE 1

| Sample | Catalyst System | DSC $T_{max}$ (° C.) |
|---|---|---|
| Comp. 1 | KOAc | 152 |
| Comp. 2 | DABCO TMR | 75 |
| Comp. 3 | TOYOCAT TRX | 84 |
| Comp. 4 | Curithane 52 | 93 and 122 |
| Inventive TCS 1 | 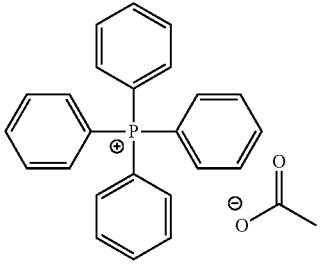 | 64 |
| Inventive TCS 2 | 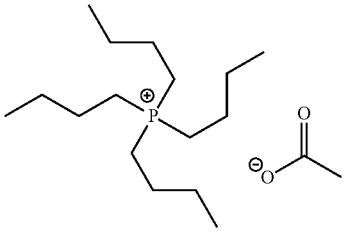 | 63 |

We claim:

1. A process for forming a polyisocyanurate/polyurethane rigid foam comprising the steps of:
providing one or more monomers selected from the group consisting of an isocyanate, a diisocyanate, a triisocyanate, oligomeric isocyanate, a salt of any thereof, and a mixture of any thereof;
providing polyol;
providing a trimerisation catalyst system comprising;
a phosphonium cation; and
an isocyanate-trimer inducing carboxylate anion;
wherein said trimerisation catalyst system has a trimerisation activation temperature in the range of equal to or less than 73° C.;
optionally providing one or more surfactants, one or more flame retardants, water, one or more antioxidants, one or more auxiliary blowing agents, one or more urethane catalysts, one or more auxiliary trimerisation catalysts, or combinations thereof;
contacting said one or more monomers, and said polyol, and optionally said one or more surfactants, and optionally said one or more flame retardants, and optionally said water, and optionally said one or more antioxidants, and optionally said one or more auxiliary blowing agents in the presence of said trimerisation catalyst system and optionally said one or more urethane catalysts, and optionally said one or more auxiliary trimerisation catalysts;
thereby forming said polyisocyanurate/polyurethane rigid foam.

2. A polyisocyanurate/polyurethane rigid foam comprising the reaction product of:
one or more monomers selected from the group consisting of an isocyanate, a diisocyanate, a triisocyanate, oligomeric isocyanate, a salt of any thereof, and a mixture of any thereof with polyol in the presence of a trimerisation catalyst system comprising a phosphonium cation, and an isocyanate-trimer inducing carboxylate anion, and optionally one or more surfactants, optionally one or more flame retardants, optionally water, optionally one or more antioxidants, optionally one or more auxiliary blowing agents, optionally one or more additional urethane catalysts, and optionally one or more auxiliary trimerisation catalysts, or optionally combinations thereof, wherein said trimerisation catalyst system has a trimerisation activation temperature in the range of equal to or less than 73° C.

3. A polyisocyanurate/polyurethane rigid foam comprising the reaction product of:
one or more monomers selected from the group consisting of an isocyanate, a diisocyanate, a triisocyanate, oligomeric isocyanate, a salt of any thereof, and a mixture of any thereof with polyol in the presence of a trimerisation catalyst system comprising a phosphonium cation, and an isocyanate-trimer inducing carboxylate anion, and optionally one or more surfactants, optionally one or more flame retardants, optionally water, optionally one or more antioxidants, optionally one or more auxiliary blowing agents, optionally one or more additional polyurethane catalysts, and optionally one or more trimerisation catalysts, or optionally combinations thereof, wherein said polyisocyanurate/polyurethane foam has a polyisocyanurate trimer ratio ($Abs_{1410}/Abs_{1595}$) of at least 5 at a depth of 12 mm from the rising surface of the rigid foam, measured via ATR-FTIR spectroscopy.

* * * * *